No. 865,615. PATENTED SEPT. 10, 1907.
E. W. SHAW.
AIR BRAKE HOSE COUPLING.
APPLICATION FILED JULY 12, 1906.
2 SHEETS—SHEET 1.
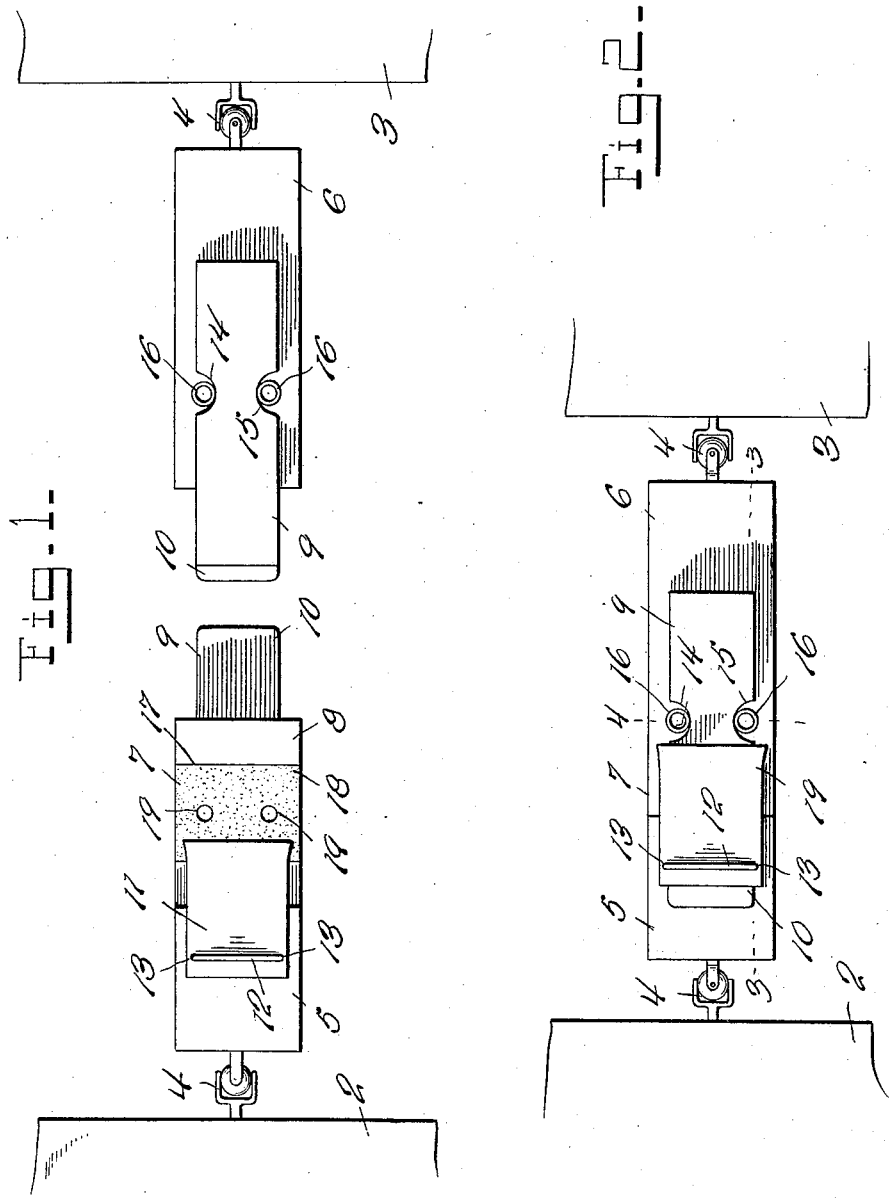
Witnesses
C. R. Thomas
F. B. MacNab
Inventor
E. W. Shaw
By Chandler & Chandler
Attorneys No. 865,615. PATENTED SEPT. 10, 1907.
E. W. SHAW.
AIR BRAKE HOSE COUPLING.
APPLICATION FILED JULY 12, 1906.

2 SHEETS—SHEET 2.

Witnesses
G. R. Thomas
F. B. MacNab

Inventor
E. W. Shaw
By Chandler & Chandler
Attorneys

UNITED STATES PATENT OFFICE.

EUGENE W. SHAW, OF WEIR, KANSAS.

AIR-BRAKE HOSE-COUPLING.

No. 865,615.  Specification of Letters Patent.  Patented Sept. 10, 1907.

Application filed July 12, 1906. Serial No. 325,904.

*To all whom it may concern:*

Be it known that I, EUGENE W. SHAW, a citizen of the United States, residing at Weir, in the county of Cherokee, State of Kansas, have invented certain new and useful Improvements in Air-Brake Hose-Couplings; and I do hereby declare the following to be a full, clear, and exact description of the invention, such as will enable others skilled in the art to which it appertains to make and use the same.

This invention has reference to couplings for air brake pipes, the especial object being the provision of a structure in which the air-brake pipes will be automatically coupled together when the cars are coupled.

The particular improvements comprise the construction of the draw-heads with oppositely disposed tongues, the outer ends of which are received in guide-members secured to the draw-heads, and in the insertion of a plate of rubber or other yielding material in the inner face of each tongue, the plates being adapted to aline with each other when the draw-heads are coupled.

A further improvement resides in the formation in each tongue of a pair of openings extending therethrough and through the yielding plate therein, and in the provision of a pipe section fitted in each opening, the pipe sections registering correspondingly when the draw-heads are coupled, and thus forming a pair of continuous air pipes, either one of which may be coupled with the usual hose sections.

The invention will be readily understood from the following detailed description and from an inspection of the accompanying drawings, in which—

Figure 3:
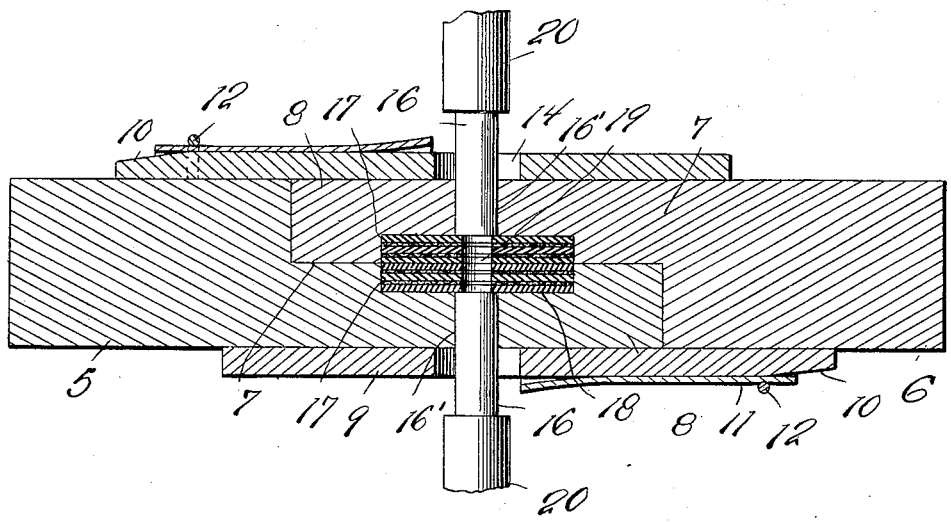
Figure 4:
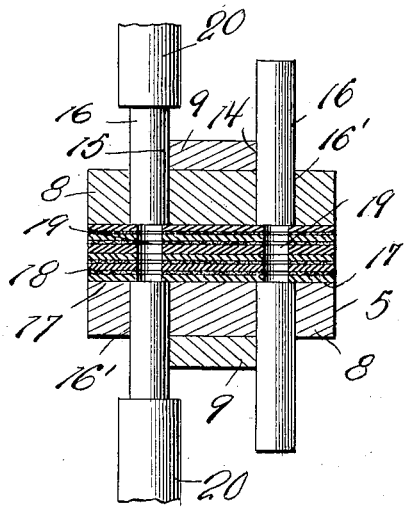

Figure 1 is a top plan view of the draw-heads in position to be coupled. Fig. 2 is a similar view showing the draw-heads coupled. Fig. 3 is an enlarged longitudinal vertical section taken on the line 3—3 of Fig. 2. Fig. 4 is a transverse section on the line 4—4 of Fig. 2.

Like parts are designated by similar reference numerals in the several views.

Referring to the drawings, the invention is shown as comprising a pair of bars 2 and 3 secured in any usual manner to the under side of the bottom frames of a pair of adjacent cars (not shown). Said bars are connected by means of universal joints 4 with the draw-heads 5 and 6, respectively. The inner ends of the draw-heads are undercut, as at 7, to form tongues 8, extending longitudinally of the draw-heads and oppositely disposed with respect to each other.

To the outer face of each tongue is secured a longitudinally extending latch 9, the outer end of which is received in and projects beyond a guide-member 11, secured to the outer face of the opposite draw-head, as indicated at 10. The guide-members, above referred to, are formed of spring metal and are slotted at their forward ends, as shown, the said members being of approximately U-shape in cross-section. Latches 9 are retained in place in the corresponding guide-members by means of clamps 12, the ends of which project through openings formed at the sides of said members, as at 13, and bear against opposite sides of the latches. The extreme forward ends of the latches are beveled to permit the same to be moved easily into place in the guide-members. The latches 9 are formed with semi-circular openings 14 and 15, arranged at opposite sides thereof, in which are fitted air-brake pipes 16, said pipes passing through openings 16′ formed in the corresponding tongues. The inner face of each tongue is undercut to form a rectangular seat 17, in which is fitted a plate 18, composed of alternate strips of rubber and canvas, the whole being vulcanized to form an approximately integral structure. Each plate 18 is provided with a pair of openings 19 registering with the corresponding air-brake pipes.

The arrangement of the above parts is such that when the draw-heads are coupled together, a pair of continuous air-brake pipes is formed by the alinement of the pipe sections and openings of one draw-head with those of the other draw-head. Either pipe, therefore, may be used, as the usual hose sections 20 may be connected with equal readiness to one or the other. It is, therefore, possible, when one of the pipe-sections at one side of any draw-head becomes broken or injured in any manner, to shift the entire piping, so to speak, to the opposite side of the train, as the hose-sections may be easily and quickly attached to and detached from the pipe-sections, while the outer rubber faces of the plates act as bearing surfaces and form an effective seal for the joint between the pipe-sections.

As will be readily understood from the above, the pipe-sections 16 and corresponding plate openings will register when the cars are moved toward each other, and the draw-heads are in place, thus automatically effecting the coupling of the pipe-sections and forming in each instance, a continuous air-brake pipe, to either of which the hose-sections may be attached. Disconnection of the cars and movement of the same in opposite directions will, in like manner, cause an automatic uncoupling of the pipe-sections. The cut-away portions 14 and 15 of the latches will permit the pipe-sections to be located nearer the horizontal medial line of the tongues, thus forming a more effective seat therefor. The forward ends of the latches are firmly held in place in the guide-members by means of the clamps.

It is to be understood that the coupling mechanism for the air-brake pipes above described is entirely independent from the car-couplers proper, which latter may be of the Janney type or of any other ordinary type now in use, and since the said couplers proper form no part of this invention, their illustration has been thought unnecessary.

Modifications and changes in the size, form, and material of the various parts and in minor details of construction, generally, may be made without departing from the spirit of the invention, which is therefore not intended to be limited to the exact construction shown and described.

What is claimed, is:—

1. A car coupling comprising a pair of draw-heads provided with longitudinally - extending oppositely - disposed tongues; a latch secured to the outer face of each tongue; means mounted on each draw-head for receiving the latch of the other draw-head; an air-pipe vertically attached to the outer face of each tongue adjacent the latch therein; a yielding laminated plate set in the inner face of each tongue; and transversely disposed with respect thereto; each plate being formed with an opening communicating with the corresponding air-pipe; and means for holding said draw-heads coupled, the plate openings registering when the draw-heads are coupled to form a continuous air passage.

2. A car coupling comprising a pair of draw-heads, provided with longitudinally - extending oppositely - disposed tongues; a latch secured to the outer face of each tongue, and formed with inwardly extending openings in its side faces; a guide-member secured to each draw-head in position to receive the latch of the opposite draw-head; a clamp mounted in each guide-member to hold said latch in place therein; an air pipe vertically mounted in the outer face of each tongue and extending through the adjacent opening in the corresponding latch; and a yielding laminated plate set in the inner face of each tongue, each plate being formed with an opening communicating with the corresponding air-pipe, the plate openings registering when the draw-heads are coupled to form a continuous air passage.

In testimony whereof, I affix my signature, in presence of two witnesses.

EUGENE W. SHAW.

Witnesses:
WM. MORTON,
M. A. SHAW.